(12) United States Patent
Wu

(10) Patent No.: US 9,686,628 B2
(45) Date of Patent: Jun. 20, 2017

(54) AUDIO CHANNEL CONTROL CIRCUIT

(71) Applicant: HON HAI PRECISION INDUSTRY CO., LTD., New Taipei (TW)

(72) Inventor: Chun-Te Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 234 days.

(21) Appl. No.: 14/525,726

(22) Filed: Oct. 28, 2014

(65) Prior Publication Data
US 2016/0007135 A1 Jan. 7, 2016

(30) Foreign Application Priority Data

Jul. 4, 2014 (CN) .......................... 2014 1 0318232

(51) Int. Cl.
H04R 5/02 (2006.01)
H04S 7/00 (2006.01)
H04R 3/12 (2006.01)
H04R 5/04 (2006.01)
H04B 1/16 (2006.01)
H04R 27/00 (2006.01)
H04S 1/00 (2006.01)
H04B 10/69 (2013.01)

(52) U.S. Cl.
CPC .............. *H04S 7/308* (2013.01); *H04R 3/12* (2013.01); *H04R 5/04* (2013.01); *H04B 1/1684* (2013.01); *H04B 10/695* (2013.01); *H04R 27/00* (2013.01); *H04R 2420/05* (2013.01); *H04S 1/00* (2013.01)

(58) Field of Classification Search
CPC . H04N 21/4104; H04N 5/44; H04M 1/72595; H04S 7/308; H04R 5/04; H04R 3/12; H04R 2420/05; H04R 5/02

USPC ......... 381/79, 306, 300, 2, 104, 15, 16, 123; 348/14.02, 732, 738, 706, 423.1, 378, 348/236; 455/550.1; 379/388.03; 375/350, 227

See application file for complete search history.

(56) References Cited

U.S. PATENT DOCUMENTS

2004/0190659 A1* 9/2004 Raj ........................ H03G 3/345
375/350
2013/0195164 A1* 8/2013 Chen ....................... H04S 1/007
375/227

FOREIGN PATENT DOCUMENTS

CN 2842876 11/2006
CN 101577851 B 4/2011

* cited by examiner

Primary Examiner — Vivian Chin
Assistant Examiner — Ubachukwu Odunukwe
(74) Attorney, Agent, or Firm — Steven Reiss

(57) ABSTRACT

An audio channel control circuit includes a filter module and a determining module. The audio channel control circuit receives a first audio signal and a second audio signal from an audio device. The first audio signal loads a first carrier signal, while the second audio signal loads a second carrier signal. The first carrier signal and the second carrier signal have different phases. The filter module filters the first audio signal and the second audio signal, separating the first carrier signal from the first audio signal and the second carrier signal from the second audio signal. According to the phases of the first carrier signal and the second carrier signal, the determining module chooses a speaker of the left audio channel or a speaker of the right audio channel to output the first audio signal or the second audio signal.

11 Claims, 9 Drawing Sheets

AUDIO CHANNEL CONTROL CIRCUIT

FIELD

The present disclosure relates to a control circuit, and more particularly to an audio channel control circuit.

BACKGROUND

In an audio device, a white connector and a red connector are often used to distinguish a left audio channel and a right audio channel. In general, the white connector connects the left audio channel to a speaker of the left audio channel, the red connector connects the right audio channel to a speaker of the right audio channel, so that sounds from the left audio channel are playing in the speaker of the left audio channel, sounds from the right audio channel are playing in the speaker of the right audio channel.

BRIEF DESCRIPTION OF THE DRAWINGS

Implementations of the present technology will now be described, by way of example only, with reference to the attached figures.

DETAILED DESCRIPTION

Figure 1:
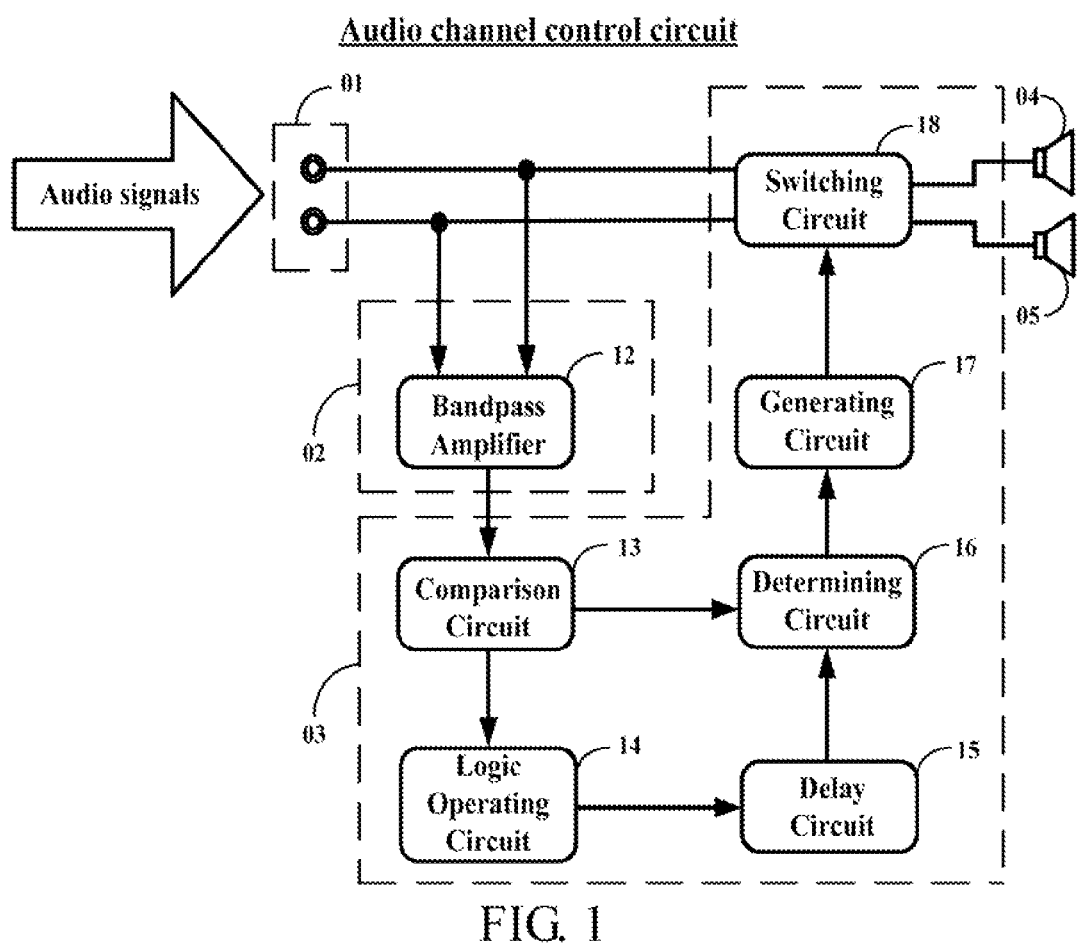
FIG. 1 illustrates a block diagram of an example embodiment of an audio channel control circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like. The following disclosure is described in relation to an audio channel control circuit.

The present disclosure is described in relation to an audio channel control circuit.

FIG. 1 illustrates a block diagram of an example embodiment of an audio channel control circuit. The audio channel control circuit includes an audio connector 01, a filter module 02, and a determining module 03.

The audio connector 01 receives a first audio signal and a second audio signal from an audio device, such as a set top box or another audio device. And the audio connector 01 outputs the first audio signal and the second audio signal through a speaker of the left audio channel 04 and a speaker of the right audio channel 05.

The first audio signal loads a first carrier signal, while the second audio signal loads a second carrier signal. The first carrier signal and the second carrier signal are out of phase. In at least one embodiment, the first audio signal and the second audio signal both load low frequency sine wave of 5 hertz (Hz) as carrier signals. Compared with the first carrier signal, the second carrier signal has a leading phase of 90 degrees. In other embodiments, the carrier signals can be signals have other frequencies and phases.

The filter module 02 filters the first audio signal and the second audio signal to separate the first carrier signal from the first audio signal and the second carrier signal from the second audio signal.

According to the phases of the first carrier signal and the second carrier signal, the determining module 03 determines a relationship among the first audio signal, the second audio signal, the right audio channel, and the left audio channel, then outputs the first audio signal and the second audio signal to speakers corresponding to the right audio channel and the left audio channel according to the determined relationship. That is, the determining module 03 determines whether the first carrier signal belongs to the right audio channel or the left audio channel and whether the second carrier signal belongs to the right audio channel or the left audio channel, and then the determining module 03 chooses the speaker of the left audio channel 04 or the speaker of the right audio channel 05 to output the first audio signal or the second audio signal.

In at least one embodiment, the filter module 02 includes a bandpass amplifier 12. The determining module 03 includes a comparison circuit 13, a logic operating circuit 14, a delay circuit 15, a determining circuit 16, a generating circuit 17 and a switching circuit 18.

The bandpass amplifier 12 couples to the audio connector 01 to filter the first audio signal and the second audio signal, then the bandpass amplifier 12 separates and amplifies the first carrier signal from the first audio signal, and the bandpass amplifier 12 separates and amplifies the second carrier signal from the second audio signal.

The comparison circuit 13 couples to the bandpass amplifier 12 sending half-wave rectifier process on the first carrier signal and the second carrier signal, then the comparison circuit 13 converts the first carrier signal to a first square signal by comparing the first carrier signal with a threshold voltage, and the comparison circuit 13 converts the second carrier signal to a second square signal by comparing the second carrier signal with the threshold voltage.

The logic operating circuit 14 couples to the comparison circuit 13 to have a logic operation process on the first square signal and the second square signal, and then the logic operating circuit 14 outputs a logic operation signal. In at least one embodiment, the logic operating circuit 14 performs logic "OR" operations at first and then performs logic "NON" operations to acquire the logic operation signal, and the logic operating circuit 14 finds difference between the first square signal and the second square signal.

The delay circuit 15 couples to the logic operating circuit 14 to delay the logic operation signal to acquire a delay signal. Moreover, a high level time of the delay signal overlaps with a high level time of the first square signal.

The determining circuit 16 couples to the comparison circuit 13 and the delay circuit 15 to compare the delay signal with the first square signal and the second square signal, then the determining circuit 16 acquires a determined result to choose the speaker of the left audio channel 04 or the speaker of the right audio channel 05 to output the first audio signal or the second audio signal.

The generating circuit 17 couples to the determining circuit 16. According to the determined result, the generating circuit 17 generates control signals to the switching circuit 18 to choose the speaker of the left audio channel 04 or the speaker of the right audio channel 05 to output the first audio signal or the second audio signal.

The switching circuit 18 couples to the generating circuit 17. According to the control signals, the switching circuit 18 controls the connection between the left audio channel and the right audio channel, in order for the speaker of the left audio channel 04 and the speaker of the right audio channel 05 to output the first audio signal and the second audio signal.

Figure 2:
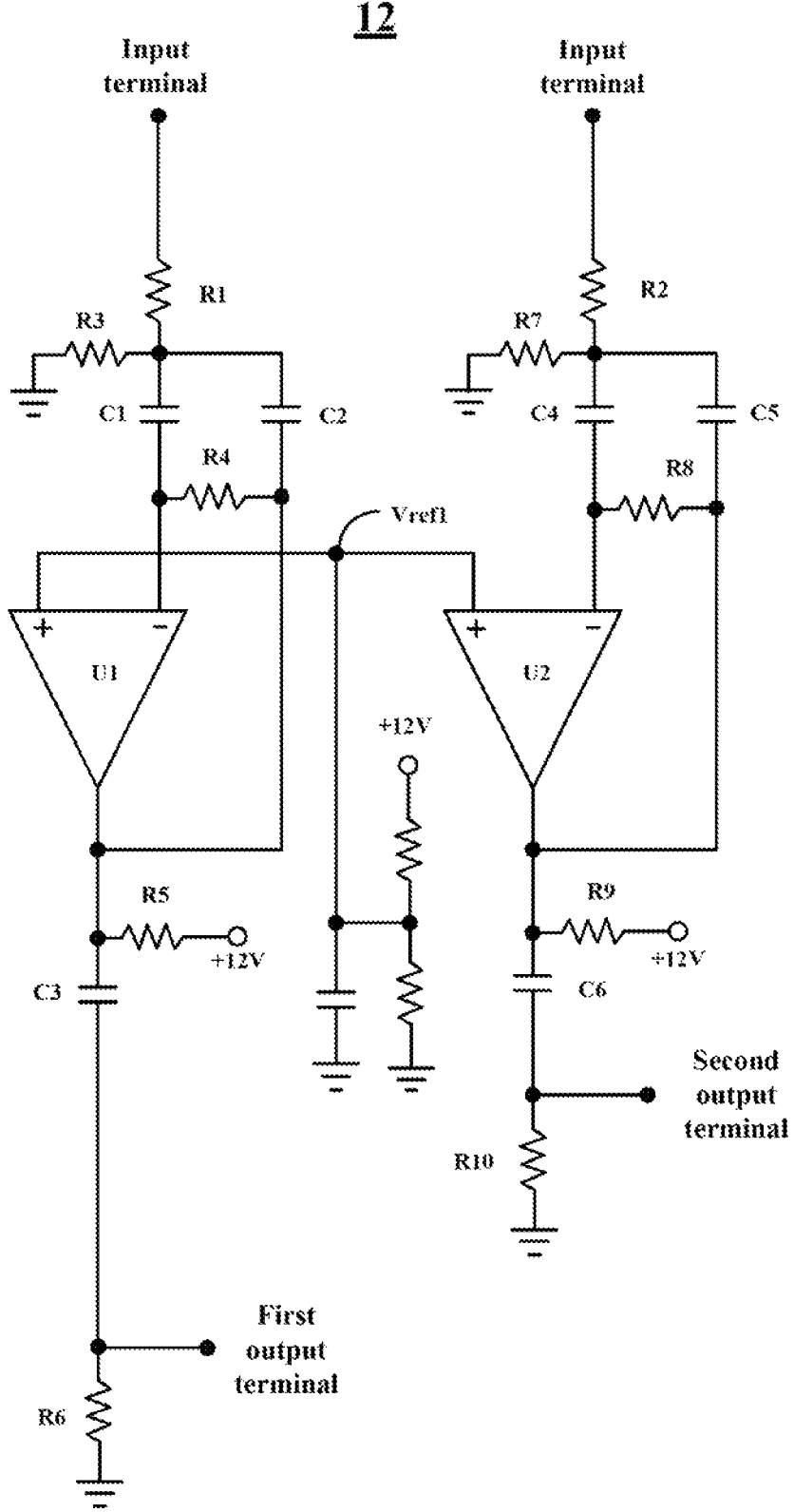
FIG. 2 illustrates a circuit diagram of an example embodiment of a bandpass amplifier of the audio channel control circuit in FIG. 1.

FIG. 2 illustrates a circuit diagram of an example embodiment of a bandpass amplifier 12 of the audio channel control circuit in FIG. 1. In at least one embodiment, the bandpass amplifier 12 includes resistors R1-R10, capacitors C1-C6, a first operational amplifier U1 and a second operational amplifier U2.

As shown in FIG. 2, a first end of the resistor R1 and a first end of the resistor R2 are input terminals of the bandpass amplifier 12. A second end of the resistor R1 couples to a first end of the resistor R3, a first end of the capacitor C1 and a first end of the capacitor C2. A second end of the resistor R3 couples to a ground. A second end of the capacitor C1 couples to one end of the resistor R4. A second end of the capacitor C2 couples to another end of the resistor R4. Signals input from the resistor R1 can be filtered through the connection above.

The inverted input of the first operational amplifier U1 couples to the second end of the capacitor C1 to receive filtered signals. The output of the first operational amplifier U1 couples to the second end of the capacitor C2 to form a feedback circuit. The output of the first operational amplifier U1 couples to a power supply +12 through the resistor R5. In addition, the output of the first operational amplifier U1 couples to the ground through the capacitor C3 and the resistor R6. A connection point between the capacitor C3 and the resistor R6 is a first output terminal of the bandpass amplifier 12.

A second end of the resistor R2 couples to a first end of the resistor R7, a first end of the capacitor C4 and a first end of the capacitor C5. A second end of the resistor R7 couples to the ground. A second end of the capacitor C4 couples to one end of the resistor R8. A second end of the capacitor C5 couples to another end of the resistor R8. Signals input from the resistor R2 can be filtered through the connection above.

The inverted input of the second operational amplifier U2 couples to the second end of the capacitor C4 to receive filtered signals. The output of the second operational amplifier U2 couples to the second end of the capacitor C5 to form another feedback circuit. The output of the second operational amplifier U2 couples to the power supply +12 through the resistor R9. As well, the output of the second operational amplifier U2 couples to the ground through the capacitor C6 and the resistor R10. A connection point between the capacitor C6 and the resistor R10 is a second output terminal of the bandpass amplifier 12. The non-inverted input of the first operational amplifier U1 and the non-inverted input of the second operational amplifier U2 couple to the power supply +12 acquiring a reference voltage Vref1. In at least one embodiment, the reference voltage Vref1 can be set as required so that the bandpass amplifier 12 can separate and amplify the first carrier signal and the second carrier signal.

Figure 3:
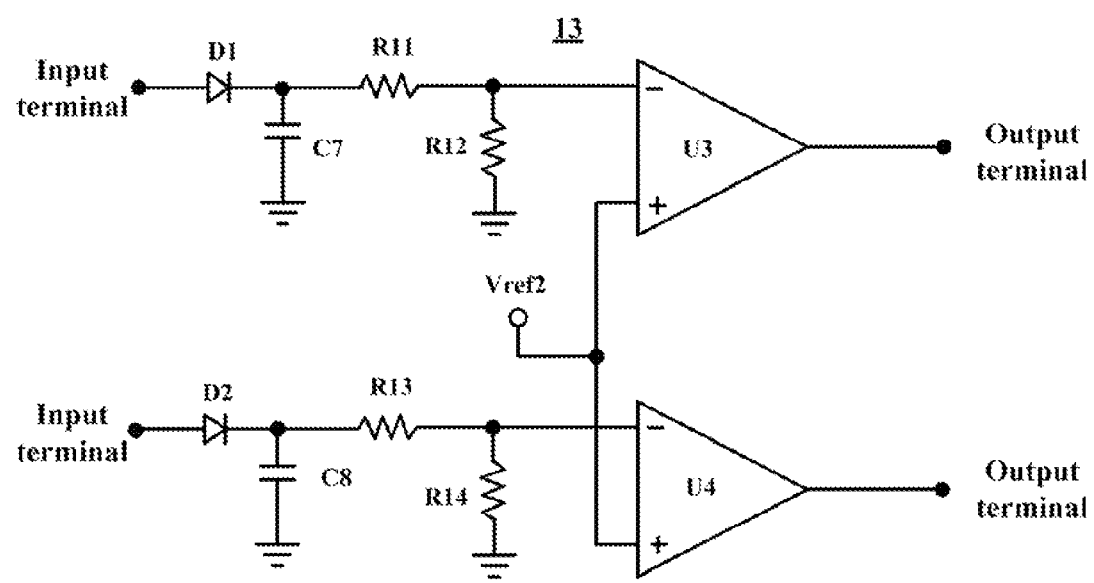
FIG. 3 illustrates a circuit diagram of an example embodiment of a comparison circuit of the audio channel control circuit in FIG. 1.

FIG. 3 illustrates a circuit diagram of an example embodiment of a comparison circuit 13 of the audio channel control circuit in FIG. 1. In at least one embodiment, the comparison circuit 13 includes a first diode D1, a second diode D2, resistors R11-R14, capacitors C7-C8, a third operational amplifier U3 and a fourth operational amplifier U4.

FIG. 3 illustrates that the first diode D1 and the second diode D2 are half-wave rectifiers. The third operational amplifier U3 and the fourth operational amplifier U4 perform voltage comparisons. An anode of the first diode D1 and an anode of the second diode D2 are input terminals of the comparison circuit 13. A cathode of the first diode D1 couples to a first end of the resistor R11 and a first end of the capacitor C7. A second end of the resistor R11 couples to a first end of the resistor R12 and an inverted input of the third operational amplifier U3. A second end of the capacitor C7 and a second end of the resistor R12 couple to ground.

A cathode of the second diode D2 couples to a first end of the resistor R13 and a first end of the capacitor C8. A second end of the resistor R13 couples to a first end of the resistor R14 and an inverted input of the fourth operational amplifier U4. A second end of the capacitor C8 and a second end of the resistor R14 couple to ground.

The non-inverted input of the third operational amplifier U3 and the non-inverted input of the fourth operational amplifier U4 couple to the power supply +12 acquiring a reference voltage Vref2. The output of the third operational amplifier U3 and the output of the fourth operational amplifier U4 are output terminals of the comparison circuit 13. In at least one embodiment, the reference voltage Vref2 can be set as required.

Figure 4:
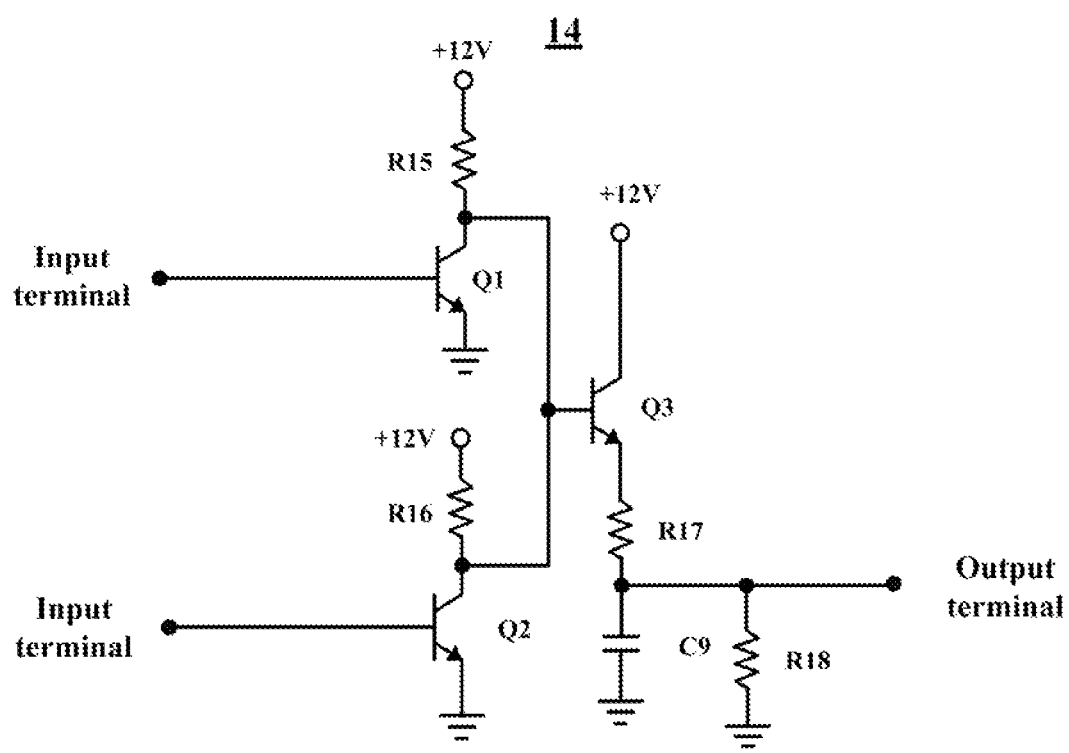
FIG. 4 illustrates a circuit diagram of an example embodiment of a logic operating circuit of the audio channel control circuit in FIG. 1.

FIG. 4 illustrates a circuit diagram of an example embodiment of a logic operating circuit 14 of the audio channel control circuit in FIG. 1. The logic operating circuit 14 includes a first transistor Q1, a second transistor Q2, a third transistor Q3, resistors R15-R18 and a capacitor C9.

FIG. 4 illustrates that a base electrode of the first transistor Q1 and a base electrode of the second transistor Q2 are input terminals of the logic operating circuit 14, an emitter electrode of the first transistor Q1 and an emitter electrode of the second transistor Q2 couple to ground, a collector electrode of the first transistor Q1 and a collector electrode of the second transistor Q2 couple to the power supply +12 through the resistor R15 and the resistor R16. The collector electrode of the first transistor Q1 and the collector electrode of the second transistor Q2 couple to a base electrode of the third transistor Q3. A collector electrode of the third transistor Q3 couples to the power supply +12. An emitter electrode of the third transistor Q3 couples to a first end of the resistor R17. A second end of the resistor R17 couples to the ground through the resistor R18 and the capacitor C9 respectively. The second end of the resistor R17 is an output terminal of the logic operating circuit 14.

Figure 5:
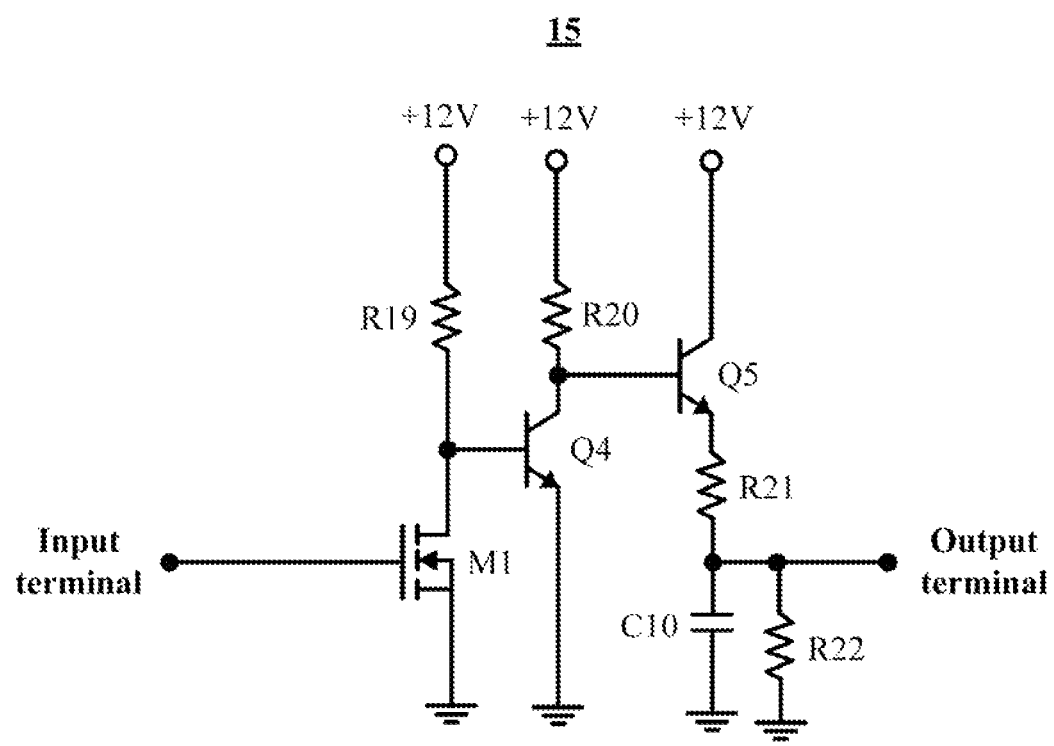
FIG. 5 illustrates a circuit diagram of an example embodiment of a delay circuit of the audio channel control circuit in FIG. 1.

FIG. 5 illustrates a circuit diagram of an example embodiment of a delay circuit 15 of the audio channel control circuit in FIG. 1. The delay circuit 15 includes a first metal oxide semiconductor field effect transistor (MOSFET) M1, a fourth transistor Q4, a fifth transistor Q5, a resistor R22 and a capacitor C10.

FIG. 5 illustrates that a grid electrode of the first MOSFET M1 is an input terminal of the delay circuit 15. A source electrode of the first MOSFET M1 couples to the ground. A drain electrode of the first MOSFET M1 couples to a base electrode of the fourth transistor Q4, and the drain electrode of the first MOSFET M1 couples to the power supply +12 through the resistor R19. An emitter electrode of the fourth transistor Q4 couples to the ground. A collector electrode of the fourth transistor Q4 couples to a base electrode of the fifth transistor Q5, and the collector electrode of the fourth transistor Q4 couples to the power supply +12 through the resistor R20. A collector electrode of the fifth transistor Q5 couples to the power supply +12. An emitter electrode of the fifth transistor Q5 couples to a first end of the resistor R21. A second end of the resistor R21 is an output terminal of the delay circuit 15. The second end of the resistor R21 couples to the ground through the resistor R22, and the second end of the resistor R21 also couples to the ground through the capacitor C10.

Figure 6:
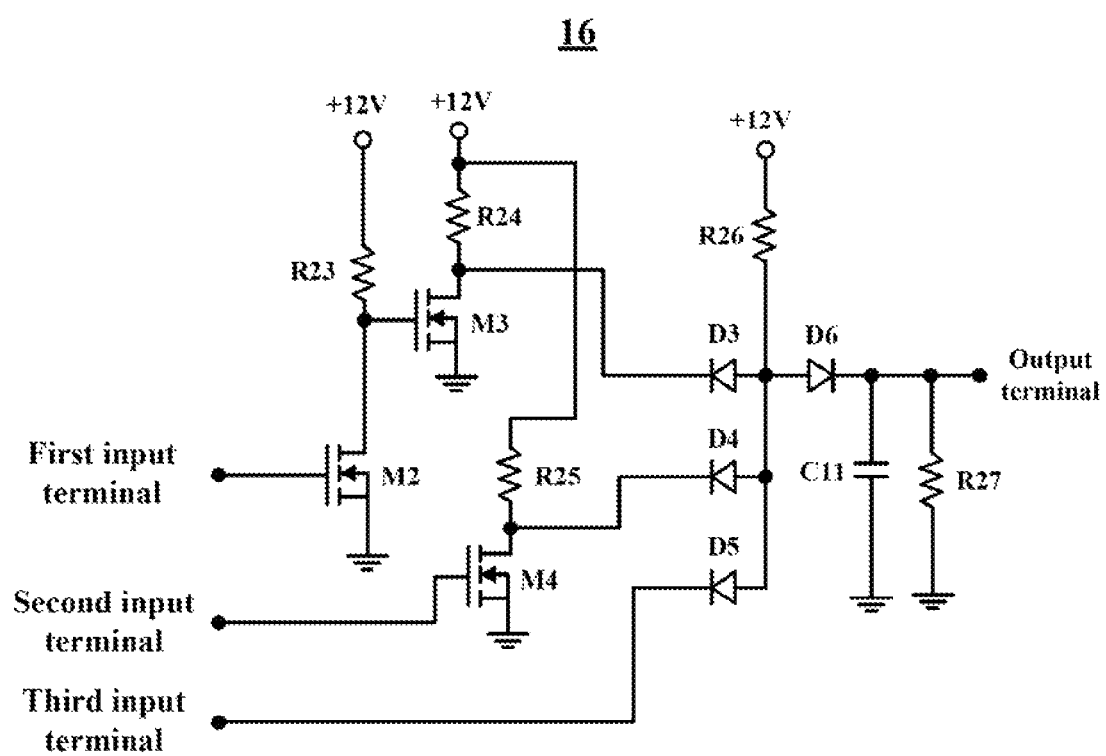
FIG. 6 illustrates a circuit diagram of an example embodiment of a determining circuit of the audio channel control circuit in FIG. 1.

FIG. 6 illustrates a circuit diagram of an example embodiment of a determining circuit 16 of the audio channel control circuit in FIG. 1. The determining circuit 16 includes a second MOSFET M2, a third MOSFET M3, a fourth MOSFET M4, a third diode D3, a fourth diode D4, a fifth diode D5, a sixth diode D6, resistors R23-R27 and a capacitor C11.

FIG. 6 illustrates that a grid electrode of the second MOSFET M2 is a first input terminal of the determining circuit 16, a source electrode of the second MOSFET M2 couples to the ground. A drain electrode of the second MOSFET M2 couples to a grid electrode of the third MOSFET M3, and the drain electrode of the second MOSFET M2 couples to the power supply +12 through the resistor R23. A source electrode of the third MOSFET M3 couples to the ground. A drain electrode of the third MOSFET M3 couples to a cathode of the third diode D3, and the drain electrode of the third MOSFET M3 couples to the power supply +12 through the resistor R24. A grid electrode of the fourth MOSFET M4 is a second input terminal of the determining circuit 16, a source electrode of the fourth MOSFET M4 couples to the ground, a drain electrode of the fourth MOSFET M4 couples to a cathode of the fourth diode D4, and the drain electrode of the fourth MOSFET M4 couples to the power supply +12 through the resistor R25. A cathode of the fifth diode D5 is a third input terminal of the determining circuit 16. An anode of the fifth diode D5 couples to an anode of the third diode D3 and an anode of the fourth diode D4, and the anode of the fifth diode D5 also couples to the power supply +12 through the resistor R26. An anode of the sixth diode D6 couples to the anode of the fifth diode D5. In at least one embodiment, a connection of the third diode D3, the fourth diode D4 and the fifth diode D5 forms a logic "AND" operation circuit. A cathode of the sixth diode D6 is an output terminal of the determining circuit 16. As well, the cathode of the sixth diode D6 couples to the ground through the capacitor C11, and the cathode of the sixth diode D6 also couples to the ground through the resistor R27.

Figure 7:
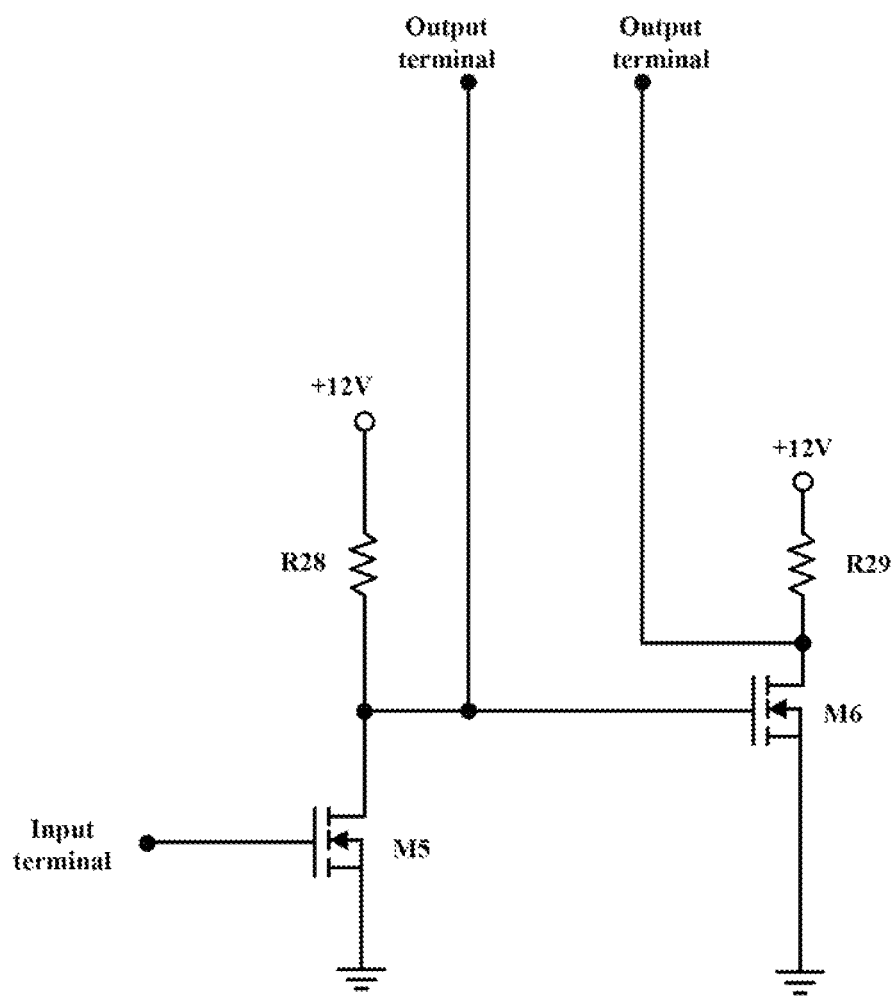
FIG. 7 illustrates a circuit diagram of an example embodiment of a generating circuit of the audio channel control circuit in FIG. 1.

FIG. 7 illustrates a circuit diagram of an example embodiment of a generating circuit 17 of the audio channel control circuit in FIG. 1. The generating circuit 17 includes a fifth MOSFET M5, a sixth MOSFET M6, a resistor R28 and a resistor R29.

As shown in FIG. 7, a grid electrode of the fifth MOSFET M5 is an input terminal of the generating circuit 17. A source electrode of the fifth MOSFET M5 couples to the ground. A drain electrode of the fifth MOSFET M5 couples to a grid electrode of the sixth MOSFET M6, and the drain electrode of the fifth MOSFET M5 couples to the power supply +12 through the resistor R28. A source electrode of the sixth MOSFET M6 couples to the ground. A drain electrode of the sixth MOSFET M6 couples to the power supply +12 through the resistor R29. The drain electrode of the fifth MOSFET M5 and the drain electrode of the sixth MOSFET M6 are two output terminals of the generating circuit 17. In at least one embodiment, the two output terminals output a high level (logic 1) enable signal and a low level (logic 0) enable signal respectively at the same time.

Figure 8:
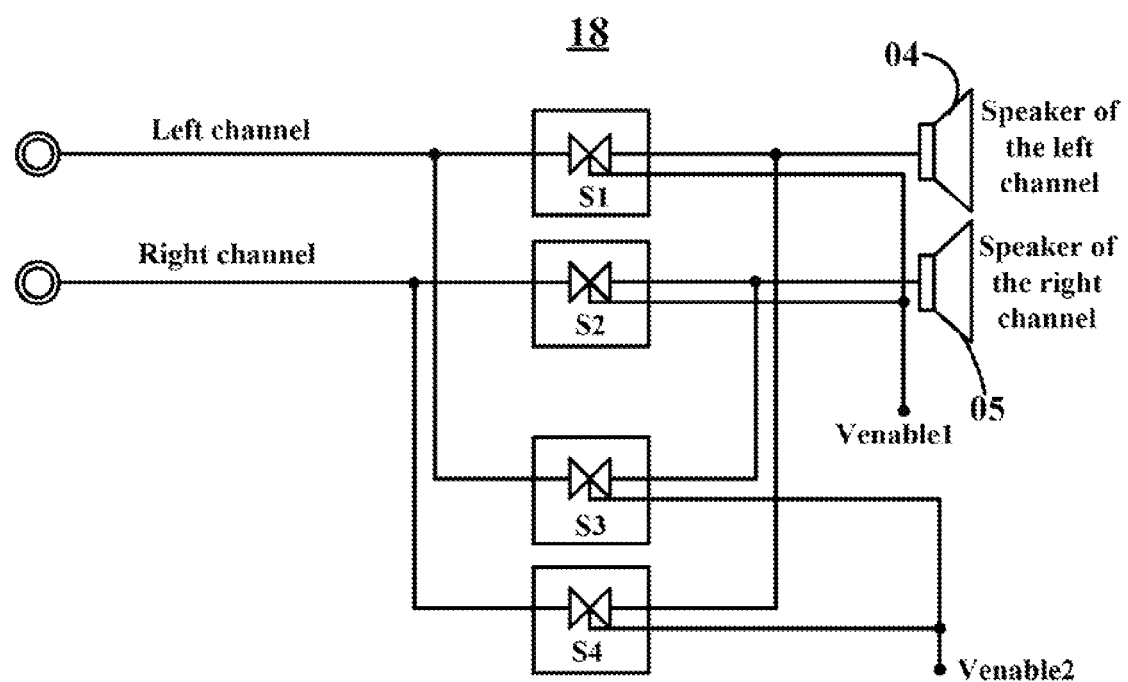
FIG. 8 illustrates a circuit diagram of an example embodiment of a switching circuit of the audio channel control circuit in FIG. 1.

FIG. 8 illustrates a circuit diagram of an example embodiment of a switching circuit 18 of the audio channel control circuit in FIG. 1. The switching circuit 18 includes a first switch unit S1, a second switch unit S2, a third switch unit S3 and a fourth switch unit S4. A first end of the first switch unit S1 couples to the left audio channel. A second end of the first switch unit S1 couples to the speaker of the left audio channel 04. A first end of the second switch unit S2 couples to the right audio channel. A second end of the second switch unit S2 couples to the speaker of the right audio channel 05. A control end of the first switch unit S1 and a control end of the second switch unit S2 both receive a first enable signal Venable1 at the same time. A first end of the third switch unit S3 couples to the left audio channel. A second end of the third switch unit S3 couples to the speaker of the right audio channel 05. A first end of the fourth switch unit S4 couples to the right audio channel. A second end of the fourth switch unit S4 couples to the speaker of the left audio channel 04. A control end of the third switch unit S3 and a control end of the fourth switch unit S4 both receive a second enable signal Venable2 at the same time. When a switch unit receives an effective enable signal, the first end of the switch unit couples to the second end of the switch unit. When the switch unit receives an ineffective enable signal, the first end of the switch unit cannot couple to the second end of the switch unit. In some embodiments, we can use a relay or other electronic switches to be the switch unit.

Figure 9:
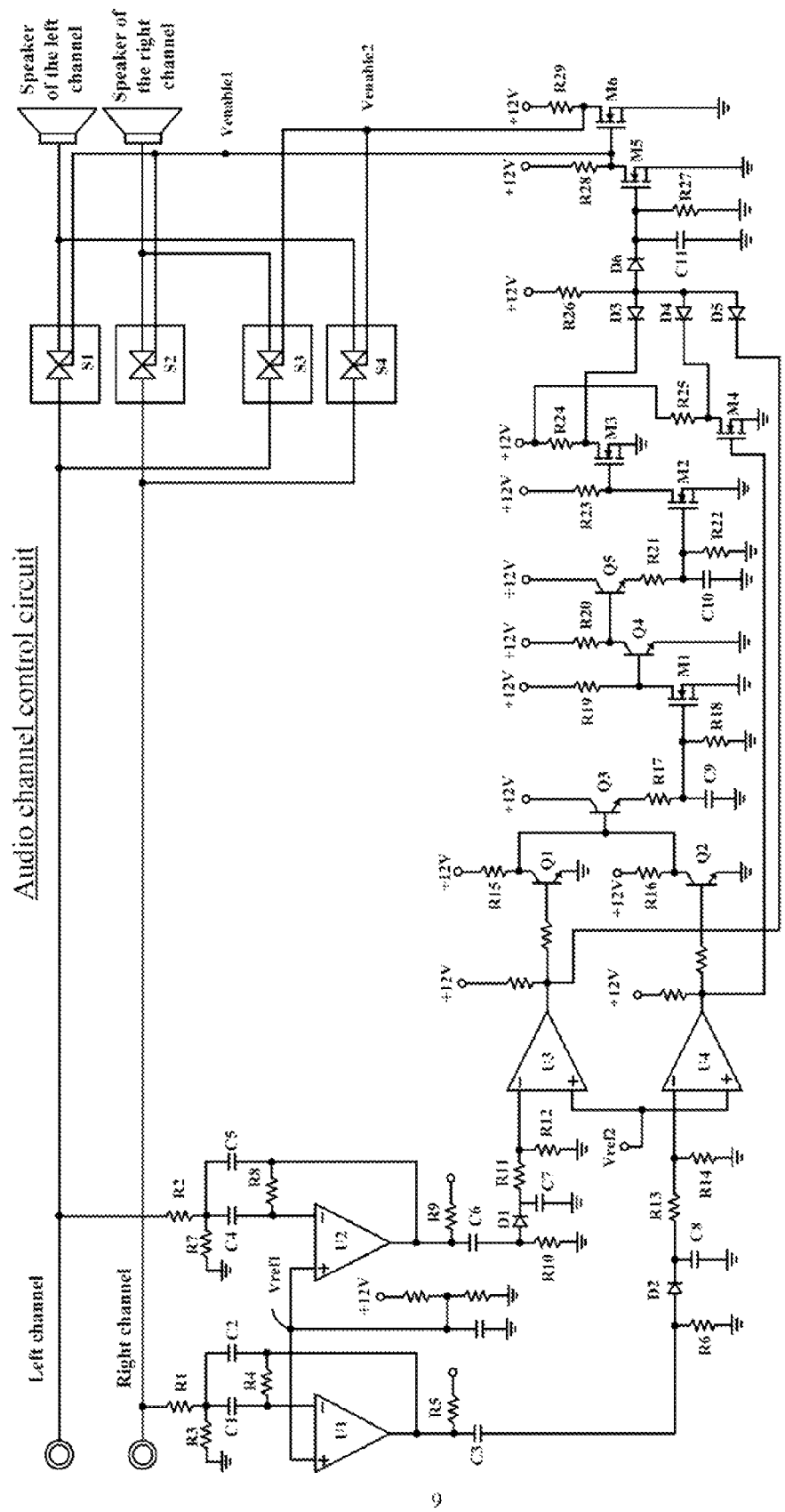
FIG. 9 illustrates a circuit diagram of an example embodiment of an audio channel control circuit.

FIG. 9 illustrates a circuit diagram of an example embodiment of an audio channel control circuit. As shown in FIG. 9, circuits mentioned above couple together to form the audio channel control circuit. If the white connector couples the left audio channel to the speaker of the right audio channel, the red connector couples the right audio channel to the speaker of the left audio channel, the first switch unit S1 and the second switch unit S2 in the audio channel control circuit receives the first enable signal Venable1 which is ineffective. Meanwhile, the third switch unit S3 and the fourth switch unit S4 in the audio channel control circuit receives the second enable signal Venable2 which is effective. The first end of the first switch unit S1 does not couple to the second end of the first switch unit S1, and the first end of the second switch unit S2 does not couple to the second end of the second switch unit S2. The first end of the third switch unit S3 couples to the second end of the third switch unit S3, and the first end of the fourth switch unit S4 couples to the second end of the fourth switch unit S4. So that the left audio channel couples to the speaker of the right audio channel and the right audio channel couples to the speaker of the left audio channel. Now the audio signals are playing in the corresponding speakers of the right audio channel and the left audio channel.

Many details are often found in the art such as the other features of a shielding plate. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An audio channel control circuit for receiving a first audio signal and a second audio signal, wherein the first audio signal loads a first carrier signal, the second audio signal loads a second carrier signal, and the first carrier signal and the second carrier signal have different phases, the audio channel control circuit comprising:
   a filter circuit configured to filter the first audio signal and the second audio signal to separate the first carrier signal from the first audio signal and the second carrier signal from the second audio signal; and
   a determining circuit configured to determine whether the first audio signal belonging to a left audio channel and whether the second audio signal belonging to a right audio channel;
   generate a first enable signal and a second enable signal; and
   output the first audio signal and the second audio signal to speakers corresponding to the right audio channel and the left audio channel respectively, according to whether the first audio signal belonging to the left audio channel and whether the second audio signal belonging to the right audio channel,
   wherein when a high level voltage is an effective enable signal and the first enable signal is the high level voltage and the second enable signal is a low level voltage, the determining circuit is configured to output the first audio signal to a left channel speaker and output the second audio signal to a right channel speaker; and
   when the high level voltage is the effective enable signal and the first enable signal is the low level voltage and the second enable signal is the high level voltage, the determining circuit is configured to output the first audio signal to the right channel speaker and output the second audio signal to the left channel speaker.

2. The audio channel control circuit as claimed in claim 1, wherein the filter module circuit comprises:
   a bandpass amplifier configured to filter the first audio signal and the second audio signal, and then separate and amplify the first carrier signal from the first audio signal and the second carrier signal from the second audio signal.

3. The audio channel control circuit as claimed in claim 2, wherein the bandpass amplifier comprises:
   a first operational amplifier with an inverted input coupled to a capacitor to receive a filtered signal, a non-inverted input coupled to a power supply, and an output coupled to another capacitor to form a feedback circuit; and
   a second operational amplifier with an inverted input coupled to another capacitor to receive another filtered signal, an output coupled to another capacitor to form another feedback circuit, and a non-inverted input coupled to the power supply.

4. The audio channel control circuit as claimed in claim 1, wherein the determining circuit comprises:
   a comparison circuit coupled to the filter circuit to have a half-wave rectifier process on the first carrier signal and the second carrier signal, and convert the first carrier signal and the second carrier signal to a first square signal and a second square signal by comparing the first carrier signal and the second carrier signal with a threshold voltage;
   a logic operating circuit coupled to the comparison circuit to have a logic operation process on the first square signal and the second square signal, and output a logic operation signal;
   a delay circuit coupled to the logic operating circuit to delay the logic operation signal and acquire a delay signal;
   a determining circuit coupled to the comparison circuit and the delay circuit to compare the delay signal with the first square signal and the second square signal, and acquire a determined result;
   a generating circuit coupled to the determining circuit to generate control signals to choose corresponding speakers of the right audio channel and the left audio channel, and output the first audio signal and the second audio signal according to the determined result; and
   a switching circuit coupled to the generating circuit to control the connection between the left audio channel, the right audio channel and the speakers of the right audio channel and the left audio channel, and output the first audio signal and the second audio signal.

5. The audio channel control circuit as claimed in claim 4, wherein the comparison circuit comprises:
   a first diode that is a half-wave rectifier;
   a second diode that is a half-wave rectifier;
   a third operational amplifier with a non-inverted input coupled to a power supply; and
   a fourth operational amplifier with a non-inverted input coupled to the power supply.

6. The audio channel control circuit as claimed in claim 4, wherein the logic operating circuit comprises:
   a first transistor with an emitter electrode coupled to a ground and a collector electrode coupled to a power supply;
   a second transistor with an emitter electrode coupled to the ground and a collector electrode coupled to the power supply; and
   a third transistor with a collector electrode coupled to the power supply, a base electrode coupled to the collector electrode of the first transistor and the collector electrode of the second transistor.

7. The audio channel control circuit as claimed in claim 4, wherein the delay circuit comprises:
   a first MOSFET with a source electrode coupled to a ground and a drain electrode coupled to a power supply;

a fourth transistor with an emitter electrode coupled to the ground and a collector electrode coupled to the power supply; and a fifth transistor and a base electrode coupled to the collector electrode of the fourth transistor, a collector electrode coupled to the power supply.

8. The audio channel control circuit as claimed in claim 4, wherein the determining circuit comprises:

a second MOSFET with a source electrode coupled to a ground and a drain electrode coupled to a power supply;

a third MOSFET with a grid electrode coupled to the drain electrode of the second MOSFET, a source electrode coupled to the ground and a drain electrode coupled to the power supply;

a fourth MOSFET with a source electrode coupled to the ground and a drain electrode coupled to the power supply;

a third diode with a cathode coupled to the drain electrode of the third MOSFET;

a fourth diode with a cathode coupled to the drain electrode of the fourth MOSFET; and a fifth diode with an anode coupled to an anode of the third diode, an anode of the fourth diode and the power supply.

9. The audio channel control circuit as claimed in claim 4, wherein the generating circuit comprises:

a fifth MOSFET with a source electrode coupled to a ground and a drain electrode coupled to a power supply; and a sixth MOSFET with a grid electrode coupled to a drain electrode of the fifth MOSFET, a source electrode coupled to the ground and a drain electrode coupled to the power supply.

10. The audio channel control circuit as claimed in claim 4, wherein the switching circuit comprises:

a first switch unit with a first end coupled to the left audio channel and a second end coupled to the speaker of the left audio channel;

a second switch unit with a first end coupled to the right audio channel and a second end coupled to the speaker of the right audio channel;

a third switch unit with a first end coupled to the left audio channel and a second end coupled to the speaker of the right audio channel; and a fourth switch unit with a first end coupled to the right audio channel and a second end coupled to the speaker of the left audio channel;

wherein a control end of the first switch unit and a control end of the second switch unit both receive the first enable signal at the same time, and a control end of the third switch unit and a control end of the fourth switch unit both receive the second enable signal at the same time.

11. The audio channel control circuit as claimed in claim 1, wherein when a low level voltage is an effective enable signal and the first enable signal is the low level voltage and the second enable signal is a high level voltage, the determining circuit is configured to output the first audio signal to a left channel speaker and output the second audio signal to a right channel speaker; and when the low level voltage is the effective enable signal and the first enable signal is the high level voltage and the second enable signal is the low level voltage the determining circuit is configured to output the first audio signal to the right channel speaker and output the second audio signal to the left channel speaker.

* * * * *